United States Patent [19]

Schwab et al.

[11] 4,162,820

[45] Jul. 31, 1979

[54] BINOCULAR TELESCOPE

[75] Inventors: Kurt Schwab, Innsbruck; Richard Koholka, Fritzens, both of Austria

[73] Assignee: D. Swarovski & Co., Wattens, Austria

[21] Appl. No.: 855,760

[22] Filed: Nov. 29, 1977

[30] Foreign Application Priority Data

Nov. 30, 1976 [DE] Fed. Rep. of Germany ....... 2654325

[51] Int. Cl.² .............................................. G02B 7/06
[52] U.S. Cl. ........................................ 350/36; 350/46; 350/77
[58] Field of Search ........................ 350/36, 46, 76, 77

[56] References Cited

U.S. PATENT DOCUMENTS 2,811,895  11/1957  Jensen ................................. 350/36 X
3,918,792  11/1975  Beecher ............................. 350/36 X

FOREIGN PATENT DOCUMENTS 765272  1/1957  United Kingdom ..................... 350/76

Primary Examiner—John K. Corbin
Assistant Examiner—Matthew W. Koren
Attorney, Agent, or Firm—Schwartz, Jeffery, Schwaab, Mack, Blumenthal & Koch

[57] ABSTRACT

A binocular telescope has a pair of eye-pieces set in threaded mounts and includes a mutual drive for the simultaneous focusing of both eye-pieces, whereby both eye-pieces are connected non-positively with each other via a frictional clutch which slides through when a predetermined limiting torsional movement is exceeded.

The binocular telescope combines such advantages of a central drive as, for instance, convenient and accurate setting, along with the advantages of diopter setting, namely accuracy and easy readability.

5 Claims, 3 Drawing Figures

BINOCULAR TELESCOPE

BACKGROUND OF THE INVENTION

1. Field of the Invention

The invention is concerned with a binocular telescope with eye-pieces set in threaded mounts and having a mutual drive for the simultaneous focusing of both eye-pieces.

2. Prior Art and Technical Considerations

In the case of binocular telescopes which are intended to be waterproof and resistant to tropical conditions the setting of the focal length of the eye-pieces cannot be carried out by means of the eye-piece bridge normally used since, in the case of this design, it is impossible to obtain sufficient sealing between the eye-piece, or eye-piece tube, and the telescope housing. Consequently, in existing binocular telescopes mutual adjustment of both eye-pieces is carried out by means of a so-called central drive. Normally, in the case of this design a driving or focusing gear is arranged on the common or joint axis of the two halves of the telescope and the rotation of this gear is transferred on to focusing rings of the two telescope halves via a gear transmission, thereby producing synchronous focal length adjustment.

In order to carry out diopter adjustment of eye-pieces which are rigidly connected with each other via the gear transmission, an intermediate gear of the gear unit can be shifted axially thereby disengaging it from the gear unit so that the eye-pieces can be adjusted relative to one another. After this adjustment the intermediate gear must be shifted axially again and thus meshed with the rest of the gear-wheels. The individual adjustment of the eye-pieces carried out in such a manner is most troublesome, and it is not suitable for example for telescopes intended for military use.

A binocular telescope already exists having two separate focusing wheels arranged on the joint axis whereby each focusing wheel is connected to a focusing ring of an eye-piece via a corresponding toothed gear. The two focusing wheels are arranged so closely to one another that they can be mutually manipulated and resulting in synchronous focal length adjustment of the eye-pieces. If, in order to adjust the diopters, only one eye-piece has to be adjusted, it is only necessary to turn one focusing wheel. This arrangement is disadvantageous, however, in that, on the one hand, an accidental shift of the diopters can easily take place and, on the other hand, it cannot be guaranteed that both focusing gears are really turned through exactly the same angle when there is corresponding manipulation.

It is also known that a belt drive can be employed instead of the gear transmission for the purpose of transmitting rotary action of a focusing wheel to the focusing rings of the eye-pieces. It has already been suggested that one of the focusing rings be arranged on the eye-piece tube in such a manner that it is clamped on the latter by means of a screw-type cap in order to make adjustment of the eye-pieces relative to one another feasible. After loosening the screw cap, the belt drive can be manipulated, i.e., an eye-piece can be adjusted without the other eye-piece being driven along with it. The screw cap must be tightened after this adjustment. Also, in the case of this design, it is considered a disadvantage that comparatively troublesome manipulation is necessary for a diopter adjustment.

OBJECT OF THE INVENTION

The object of invention is to provide a binocular telescope of the afore-described type wherein the adjustment of the diopters can be carried out quickly and simply, in other words if possible, with a single manipulation.

In accordance with the invention, this afore-described object is accomplished in such a manner that both eye-pieces are connected non-positively with one another via a friction clutch which slides through when a certain limiting torsional moment is exceeded.

According to the instant invention, under normal conditions, both eye-pieces are frictionally connected to one another, i.e., the adjustment of one eye-piece, or of one focusing wheel, results inevitably in the synchronous focal length adjustment of the other eye-piece. However, should the adjustment of the eye-pieces relative to one another be necessary—for example in order to adjust the diopters—it is sufficient to hold one eye-piece or focusing wheel and then turn the other one in relation to it. In the case of this adjustment a certain limiting torsional force has to be overcome. Additional manipulation as for instance the disengagement of one part or the re-engagement of another is not therefore necessary.

In a further embodiment of the invention both eye-pieces can be adjusted via a central drive in a manner known per se, whereby the clutch is arranged between the gear chains which connect the eye-pieces to one another. Preferably, the central drive should be mounted a shaft upon which a focusing wheel is mounted so as to be torsionally rigid. Since, in normal situations, both gear chains are coupled by the clutch, the focusing of the eye-pieces can be carried out in such a manner that the focusing wheel on the shaft of the central drive is adjusted accordingly. In order to adjust the diopters, it is only necessary to hold one eye-piece and to turn the other as far as is necessary to overcome the retaining force of the clutch.

In a further embodiment of the invention two focusing wheels, which are rigidly connected to the eye-pieces, are arranged beside each other on the axis of rotation of the central drive, so that the clutch is situated between the focusing wheels. This approach has the advantage that scales can be affixed to the focusing wheels off of which the diopter setting in question can be read. Preferably, the clutch should be a plate spring which is secured in place between the focusing wheels. In this case, the tension of the plate spring is selected in such a manner that its biasing force is sufficient to transmit the adjusting forces, which normally occur, from one focusing wheel to the other.

According to a further embodiment of the invention the clutch consists of a spring, in particular a plate spring, which presses a loose driving wheel of a gear chain against a driving wheel which is connected rigidly to the shaft of the other gear chain. The loose driving wheel is arranged on the shaft of the central drive. This approach is advantageous in that the plate spring need only have small dimensions since it only has to supply a pressing force which, dependent on the coefficient of friction for the transmission of the adjustment torsial moment, must be present between two driving wheels. Consequently, the clutch can be constructed even more compactly.

According to a further embodiment of the invention both eye-pieces can be adjusted in a manner known per se via a central drive. The clutch is arranged between a lens tube, which is axially adjustable only, and an adjusting tube of an eye-piece, whereby the adjusting tube is on the one hand, axially adjustable by the central drive and, on the other hand, rotatable relative to the central drive when the retaining force of the clutch has been overcome. Accordingly the lens tube and the adjusting tube of the other eye-piece are rigidly connected to one another and are only axially movable. Consequently, the diopter scale can be affixed as in the case of ordinary telescopes so that the set difference can be clearly read off.

With this approach the central drive should preferably be a gear-wheel drive with intermediate gears which, on the one hand, are rigidly connected to a shaft with an adjusting wheel and which, on the other hand, are rigidly connected to the focusing rings surrounding the eye-pieces. The focusing rings should preferably have an internal thread which is in engagement with an external thread on the adjusting tubes.

The axially movable and rotating lens should preferably have an external flange which is pressed against a counter flange on the adjusting tube by a plate spring propped against the eye-piece adaptor. A clutch construction of this nature is especially space-saving and can be produced at low cost.

A main advantage of the binocular telescope according to this invention lies in the fact that the diopter adjustment can be carried out extremely simply and quickly.

BRIEF DESCRIPTION OF THE DRAWINGS

In the following, the embodiments of the invention are explained by way of example by means of the enclosed drawings. The figures denote the following.

DETAILED DESCRIPTION OF THE PREFERRED EMBODIMENT

Figure 1:
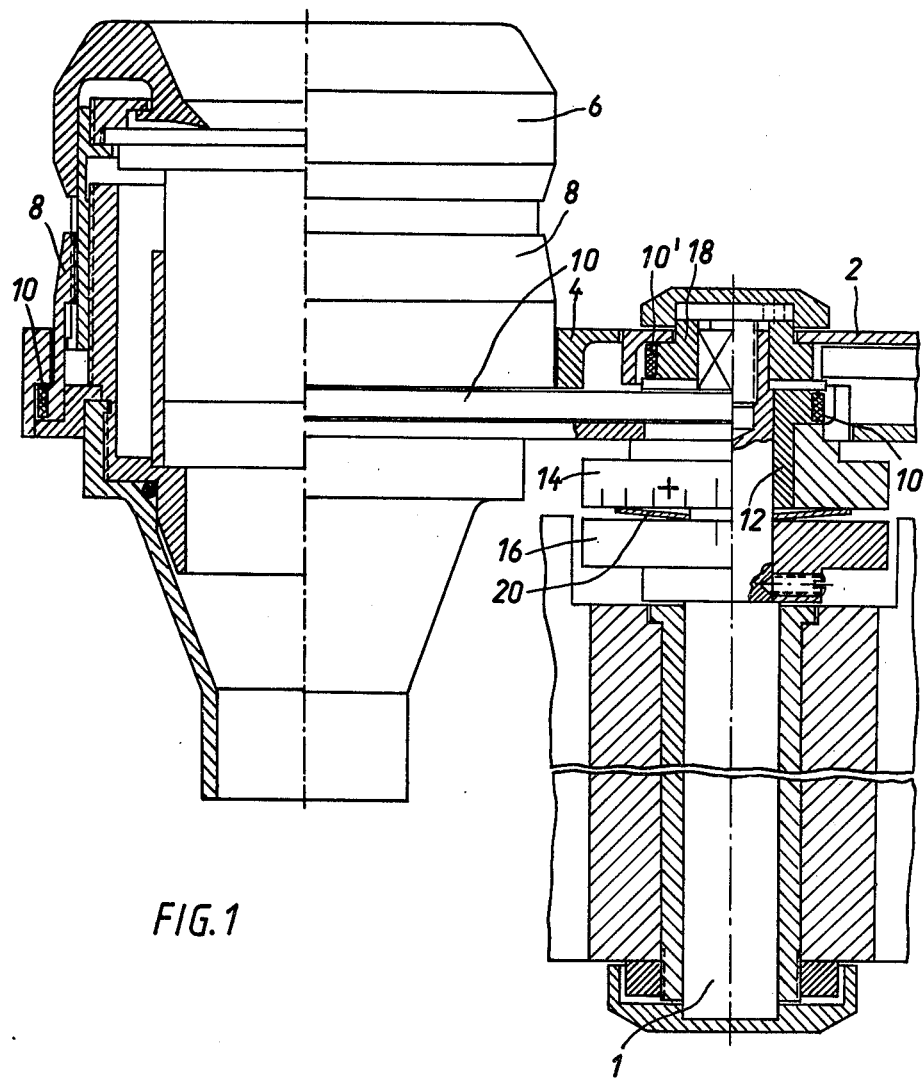
FIG. 1 is a partially sectioned binocular telescope with central drive according to a first embodiment of the invention.

Joint frames 2 and 4 are swivel-mounted for both telescopes on the rigid joint axis 1. The joint frame 2 is not fully illustrated in FIG. 1 since its construction is a mirror image of joint frame 4. In the following description, only one telescope is described, however it is to be understood that the construction of the other telescope is an identical mirror or reflected image of the first.

The eye-piece 6 is mounted in a bore-hole of the joint frame 4. The eye-piece 6 consists of several tubes which fit into one another and whose particular construction is of no importance with respect to the present invention. It is only important to realize that the adjustment of one focusing ring 8, which surrounds the eye-piece, results in an axial adjustment of the latter in one or other direction, the focal length being adjusted accordingly. The focusing ring 8 is connected with a drive belt 10. This drive belt 10 is connected to a driving gear 12 arranged on the joint axis 1 so that it can be rotated. The driving gear 12 is connected rigidly to a focusing wheel 14.

A further focusing wheel 16 is positioned adjacent to the focusing wheel 14. The former (focusing wheel 16) is connected to the joint axis 1 in such a manner that it is torsionally rigid. On the upper end of the joint axis 1, a further driving gear 18 is key mounted the latter being also connected to the joint axis 1 in such a manner that it is torsionally rigid. Upon turning the joint axis 1 by focusing wheel 16, driving gear 18 is rotated and consequently the belt 10 is rotated. The belt 10 is trained around the focusing ring of the eye-piece which is not illustrated but which is constructed identically to the illustrated eye piece.

A plate spring 20 is secured in place between the focusing wheels 14 and 16. The bias of this plate spring is great enough that so that the adjustment of either focusing wheel, 14 or 16, results in the other focusing wheel being driven by friction. The illustrated eye-piece 6 is therefore manipulated by focusing wheel 14, driving gear 12, drive belt 10 and focusing ring 8. The second eye-piece, which is not illustrated, is manipulated by focusing wheel 16, joint axis 1, driving gear 18 and drive belt 10' which leads to the focusing ring of the second eye-piece.

Since the two focusing wheels 14, 16 are frictionally connected to one another any adjustment of one wheel leads to the synchronous focal length adjustment of both eye-pieces. This adjustment is independent of which one of the two focusing gears is adjusted and is dependent on whether the two focusing gears are adjusted simultaneously.

If only one eye-piece is to be turned, one of the focusing gears is held and the other one is turned, whereby the force of friction due to the plate spring 20 is overcome. The bias of the spring 20 is selected preferably in such a manner that, on the one hand, when one gear is turned the other focusing gear will definitely be driven along but that, on the other hand, the adjusting force is not immoderately high when one gear is held so that one eye piece can be adjusted without the other eye piece moving.

Since it is extremely simple to carry out the adjustment of the diopters in this manner, no measures need be provided to compensate the diopter adjustment when the joint frame is being moved.

It is a known fact that the eye-pieces are mutually maladjusted when the two joint frames 2 and 4 are folded around the joint axis 1, or when the angle enclosed by both joint frames 2, 4 is enlarged or reduced. In the case of binocular telescopes with belt drive already known, complicated designs are intended solely to avoid such diopter maladjustment. In the present case, however, the adjustment of the diopters can be carried out so simply and easily that these complicated designs can be done without.

Figure 2:
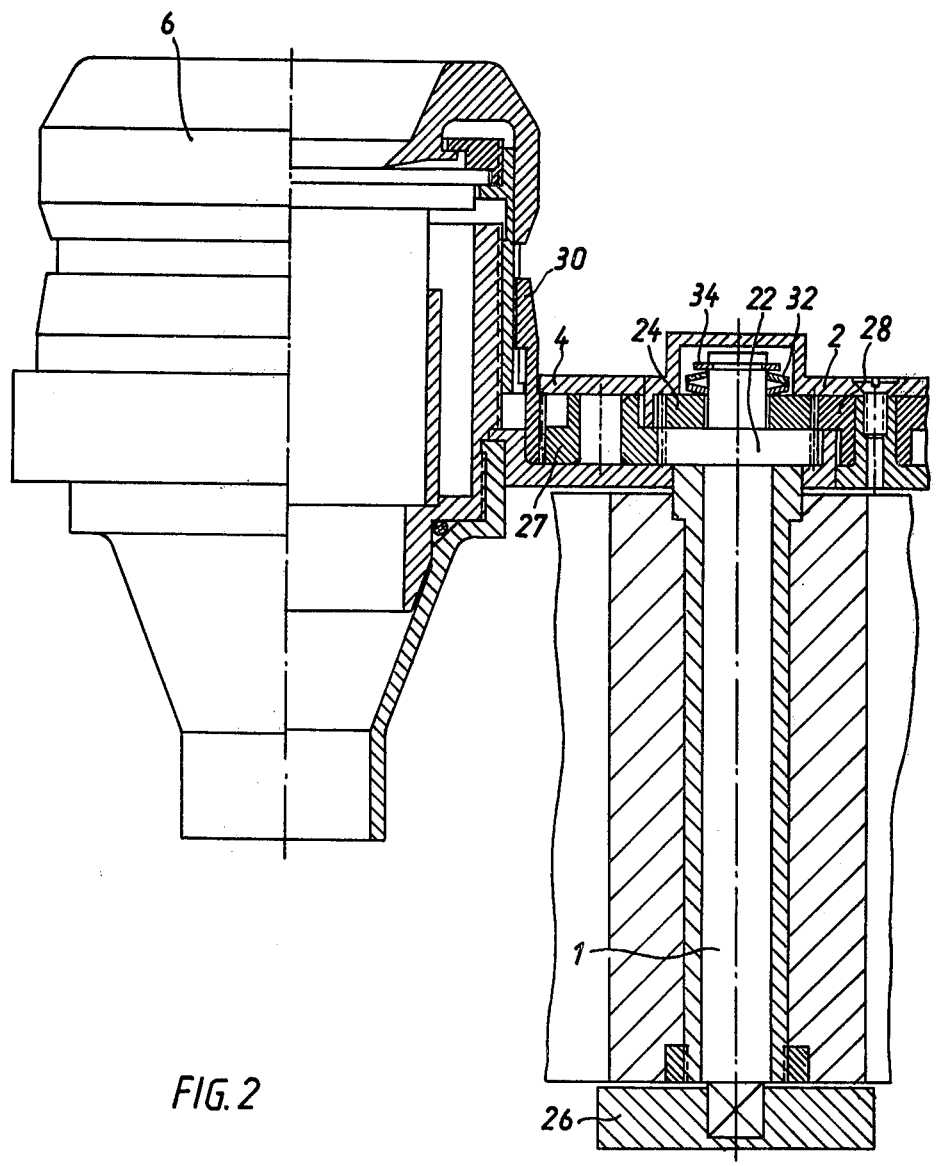
FIG. 2 is a partially sectioned binocular telescope with central drive according to a second embodiment of the invention.

FIG. 2 shows a second embodiment of the binocular telescope wherein the belt drive is replaced by first and second gear trains wherein the first gear train is positively connected to one eye piece and the second gear train is connected to the other eye piece via a clutch. In the joint axis, a shaft 1 is mounted which carries a driving gear 22 with outer gearing connected to the upper part of the upper end of the shaft. A focusing gear 26 is secured on the other end of the shaft 1 in such a manner that it is torsionally rigid. A further driving gear 24 is positioned on the shaft above the driving gear 22 so as to be freely rotatable on the shaft 1. The joint frames are designed as a gear housing 56 in which intermediate gears 27, 28 are disposed, whereby driving gear 22 is in mesh with the intermediate gear 27 and driving gear 24 is in mesh with the intermediate gear 28.

The intermediate gear 27 is in mesh with the outer gearing of a focusing ring 30, which has the same function and design as the focusing ring 8 in the embodiment illustrated in FIG. 1. The intermediate gear 28 is correspondingly in mesh with the outer gearing of the focusing ring for the second eye-piece which is not illustrated. The adjustment of the focusing rings again results in the axial adjustment of the eye-pieces and consequently in a change of the focal length.

A plate spring 32, which is secured between a lock washer 34 and driving gear 24, is arranged on the end of the shaft 1 situated in the joint frame. Driving gear 24 is pressed against driving gear 22 by the force of the spring 32. In this case the initial force is so large that the frictional force between both driving gears is sufficient to adjust or drive along the driving gear 24 when the driving gear 22 is adjusted via shaft 1 and focusing gear 26. The plate spring only has to supply the bias. Its effective diameter for the transmission of the torsional moment depends on the size of the driving gears.

Adjustments of the diopters is carried out by holding the eye-piece, not illustrated and by simultaneously adjusting the focusing gear 26. In so doing, the retaining force of the "frictional clutch" is overcome, i.e., the eye-piece 6 is adjusted via driving gear 22, intermediate gear 27 and focusing ring 30, while the eye-piece, not illustrated, remains motionless. It goes without saying that the adjustment can also be carried out by holding the second eye-piece and turning eye-piece 6.

Figure 3:
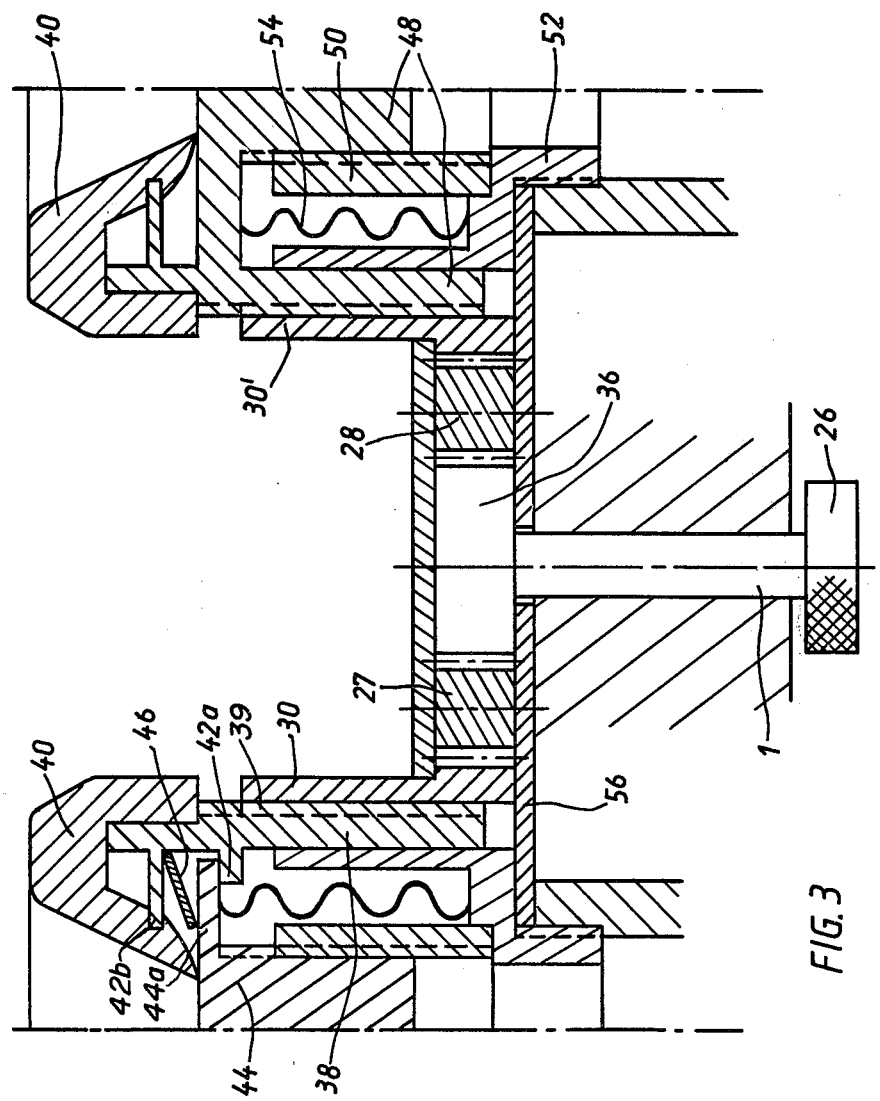
FIG. 3 is a schematic cross section of the central drive of a binocular telescope according to a third embodiment of the invention, whereby only half of each eye-piece is shown.

FIG. 3 schematically illustrates a third embodiment of the binocular telescope. This embodiment offers the additional advantage that the diopter adjustment can be clearly and reproducibly set and read off.

As in the case of the embodiment according to FIG. 2, which has been previously described, a shaft 1 with an adjusting wheel 26 thereon is provided, whereby a driving gear 36, used as an intermediate gear, is secured on the upper end of the shaft 1, within the housing 56. The driving gear 36 is in mesh with the intermediate gears 27, 28, which are positioned in the joint frame and which are in mesh with the focusing rings 30, and 30' respectively. The focusing rings 30, 30' have internal threads, preferably helical acme threads which run in contact with the helical external thread of an adjusting tube 38. The upper end of the adjusting tube 38 is so constructed that the eye-piece adaptor 40 can be affixed to it.

A counter flange or inwardly projecting shelf 42a is constructed in the upper part of the adjusting tube 38. This counter flange is turned radially towards the inside and an inwardly projecting shelf 44a of the lens tube 44 rests on it. The lens tube 44 is designed in such a manner that it can only undergo axial adjustments. Furthermore, it cannot be rotated.

The lens tube 44 is pressed against the counter flange 42 of the adjusting tube 38 by means of a plate spring 46 having one surface thereof against a second inwardly projecting shelf 42b in such a manner that both parts are frictionally connected or coupled to each other for axial motion. The shelves 42a and 44a form overlapping surfaces which are engaged by the spring 46 to form a friction clutch. For its part, the plate spring 46 is propped against a projection on the adjusting tube 38, the projection being correspondingly designed. Referring to the other eye-piece, the lens tube and the adjusting tube form an integrated or rigid structure 48 which can be moved axially in a guide tube 50 which is provided with a slot for this purpose. Unlike the previously described eye-piece, the adjusting tube cannot be turned.

A sealing bellows 54, which should preferably be pasted or adhered into position, and which seals the lens tube against moisture, is arranged between the lens tubes 44 and 48 and an eye-piece fitting 52 which is screwed into the housing of the telescope. The bellows permits axial motion, within the limits necessary for an adjustment of the focal length. The focusing of the eye-pieces is carried out in the usual fashion by adjustment of the adjusting gear 26. An adjustment of the adjusting gear 26 causes a corresponding adjustment of the shaft 1, of the central gear 36, of the intermediate gears 27, 28 and consequently an adjustment of the focusing rings 30 and 30' as well. These focusing rings run in contact with the adjusting tubes 38, 48, by means of a helical acme thread, in such a manner that a corresponding axial adjustment of the adjusting tubes, and thus an adjustment of the lens tubes, results when the focusing rings are rotated.

The adjustment of the diopters is carried out by turning the eye-piece adaptor 40, and consequently the adjusting tube 38, relative to the housing 56 of the telescope. The desired diopter adjustment can be clearly determined by means of a diopter scale affixed to the eye-piece adaptor 40. The bias of the plate spring 46 is such that the eye-piece adaptor 40 can be turned using a reasonable amount of force.

The adjustment of the lens tubes of both eye-pieces relative to one another may be carried out in various ways. In situations where the acme thread between the focusing ring 30 and the adjusting tube 38 provides little resistance so that practically no force is transmitted to the focusing ring 30 when the eye-piece adaptor 40 is rotated, the adjusting tube 38 in the focusing ring will be screwed up or down and the lens tube 44 will be moved accordingly along with it. As already explained in the case of the other eye-piece, the lens tube 44 runs in a guide tube with a slot in such a manner that it can only be moved axially.

However, in the case of the acme thread providing high resistance, so that when the eye-piece adaptor 40 is turned, the focusing ring 30 is driven through the saame angular distance, the focusing ring 30' is also adjusted by the same amount via the gear train 27, 36, 28. The rotation of the focusing ring 30' results, however, in a corresponding adjustment of the lens tube 48. If the friction of the acme thread between the focusing ring 30 and the adjusting tube 38 has a medium value, so that the focusing ring 30 is driven with corresponding backlash by the eye-piece adaptor 40, both lens tube 44 and lens tube 48 will be adjusted. However, the sum of both adjustments corresponds exactly to the desired diopter adjustment.

Hence, the special advantage of this embodiment lies in the fact that for adjusting the diopters no other part, as for example, the focusing wheel 26 has to be held. It is sufficient to rotate only the eye-piece adaptor 40 as required. The setting can be carried out in a reproducible manner and exactly by means of a diopter scale affixed to the eye-piece adaptor 40. Thus the diopters are set in precisely the same way as the common, widespread telescopes with an eye-piece bridge. It is therefore not necessary to adapt oneself to a different way of doing things when using the telescope according to this invention. The embodiment of the binocular telescope as described combines the advantages of a central drive, such as for instance convenient and accurate setting, along with the advantages of diopter setting similar to traditional telescopes with an eye-piece bridge, namely accuracy and easy readability.

We claim:

1. In a binocular telescope having a pair of eye-pieces set in threaded mounts wherein a mutual drive simultanously focuses both eyepieces and frictional clutch means connects the eyepieces to one another so that the clutch means slips when one eyepiece is held stationary while the other eyepiece is turned so as to selectively render the eye-pieces independently adjustable, wherein the improvement is characterized by:

the first eye-piece including a first lens tube and first adjusting tube which are rigidly connected to one another and are both restricted to axial movement with respect to the binocular telescope;

the second eye-piece including a second lens tube, and means for restraining the lens tube to axial movement only, and a second adjusting tube, coaxially disposed with relation to the second lens tube, wherein the second adjusting tube is both axially and rotatably adjustable and is coupled to the second lens tube by the friction clutch means; and the mutual drive including central drive means that operates rotatable means connected to the adjusting tubes of both eyepieces and to the central drive means, whereby rotation of the central drive means rotates said rotatable means for axially displacing said adjusting tubes and said lens tubes; wherein rotation of said second adjusting tube axially moves said second lens tube and, through said rotatable means and said central drive means, axially moves said first lens tube, as long as said clutch couples said second adjusting means to said second lens tube; and wherein, when there is a predetermined resistance to rotation between the second adjusting tube and the rotatable means, the second adjusting tube rotates and moves axially relative to the rotatable means to displace the second lens tube axially while the first lens tube remains stationary.

2. The binocular telescope of claim 1 wherein the rotatable means are focusing rings, one of which is coaxial with each adjusting tube and each of which is connected to its coaxial adjusting tube by helical thread means, whereby rotation of the focusing rings axially moves the adjusting rings, and wherein the central drive means comprises a rotatable shaft with a focusing knob thereon and gear means meshed with the focusing rings for rotating the focusing rings upon rotation of the focusing knob or rotation of the first adjusting tube.

3. The binocular telescope of claim 2 wherein the clutch means comprises overlapping surfaces on the second lens tube and second adjusting tube and a spring for normally urging the surfaces together to couple the second adjusting tube to the second lens tube so as to inhibit relative rotation therebetween.

4. The binocular telescope of claim 3 wherein the second lens tube is within the second adjusting tube; wherein the overlapping surfaces of the clutch means includes an outwardly projecting shelf on the second lens tube which overlies an inwardly projecting shelf on the second adjusting tube, and wherein the spring means is a plate spring disposed between another inwardly projecting shelf on the second adjusting tube and the outwardly projecting shelf on the second lens tube so as to urge the outwardly projecting shelf on the second lens tube into engagement with the inwardly projecting shelf on the second adjusting tube.

5. A binocular telescope having first and second eyepieces having first and second lens tubes associated therewith, each of which is restricted to axial motion, wherein each lens is disposed coaxially within a focusing ring and is advanced axially by rotation of the focusing ring via an adjusting tube which is driven to reciprocate, as the focusing ring rotates, by a helical thread connecting the adjusting tube to the focusing ring, and wherein the focusing rings are rotated simultaneously by gear means driven by a single shaft with an adjusting knob thereon to effect simultaneous adjustment of the eye-pieces, the improvement characterized by:

means for rigidly connecting the first lens tube to the adjusting ring associated therewith to form a unit restricted to axial movement; and friction clutch means for coupling the second lens tube to the adjusting tube associated therewith, wherein if the resistance between the adjusting tube and focusing ring associated therewith exceeds a predetermined level the friction clutch means slips when the adjusting tube is rotated, whereby the adjusting tube rotates and moves axially on the helical thread whereby moving the second lens tube axially and independently of the first lens tube, and wherein if the resistance is less than the predetermined level the clutch does not slip whereby rotation of the second lens tube effects axial movement of the first lens tube.

* * * * *

UNITED STATES PATENT AND TRADEMARK OFFICE
CERTIFICATE OF CORRECTION

PATENT NO. : 4,162,820
DATED : July 31, 1979
INVENTOR(S) : Kurt Schwab and Richard Koholka It is certified that error appears in the above-identified patent and that said Letters Patent are hereby corrected as shown below:

Column 2, line 3, after "of" insert --this--; and
　　　　　line 32, after "mounted" insert --on--.

Column 3, line 4, after "is" insert a comma (--,--).

Column 5, line 11, after "and" insert --the--;
　　　　　line 41, after "30" delete the comma (","), and
　　　　　　　after "30'" insert a comma (--,--);
　　　　　line 48, delete "422" and insert therefor --42a--; and
　　　　　line 51, change "inwardly" to --outwardly--.

Column 6, line 43, delete "saame" and insert therefor --same--.

Column 8, line 43, change "whereby" to --thereby--.

Signed and Sealed this

Twenty-sixth Day of February 1980

[SEAL]

Attest:

SIDNEY A. DIAMOND

Attesting Officer　　Commissioner of Patents and Trademarks